United States Patent
Tsuruoka

(10) Patent No.: US 11,639,855 B2
(45) Date of Patent: May 2, 2023

(54) SETTING DEVICE AND SETTING METHOD OF TRAVELING ROUTE

(71) Applicant: Toyota Jidosha Kabushiki Kaisha, Toyota (JP)

(72) Inventor: Noriyuki Tsuruoka, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 333 days.

(21) Appl. No.: 17/153,255

(22) Filed: Jan. 20, 2021

(65) Prior Publication Data

US 2021/0239474 A1    Aug. 5, 2021

(30) Foreign Application Priority Data

Feb. 5, 2020    (JP) ............................. JP2020-017792

(51) Int. Cl.
*G01C 21/34* (2006.01)

(52) U.S. Cl.
CPC ..... *G01C 21/3446* (2013.01); *G01C 21/3407* (2013.01)

(58) Field of Classification Search
None
See application file for complete search history.

(56) References Cited

U.S. PATENT DOCUMENTS

| | | | |
|---|---|---|---|
| 2018/0046198 A1* | 2/2018 | Nordbruch | G01C 21/3685 |
| 2018/0240343 A1* | 8/2018 | Nordbruch | G05D 1/0214 |
| 2019/0276011 A1 | 9/2019 | Eshima | |
| 2021/0180954 A1* | 6/2021 | Hiyokawa | G08G 1/09685 |

FOREIGN PATENT DOCUMENTS

| | | |
|---|---|---|
| JP | H04160608 A | 6/1992 |
| JP | H10264839 A | 10/1998 |
| JP | 2019-153226 A | 9/2019 |

* cited by examiner

*Primary Examiner* — Peter D Nolan
*Assistant Examiner* — Roy Rhee
(74) *Attorney, Agent, or Firm* — Dinsmore & Shohl LLP

(57) ABSTRACT

A setting device is configured to: determine whether a target route indicating a segmented route is curved based on map information; calculate an end-to-end distance from coordinates of a terminating end of the target route to coordinates of a terminating end of an arc in a direction of a coordinate axis in which a preceding segmented route extends; cause the entire arc to slide by an amount corresponding to the end-to-end distance in a direction parallel to the coordinate axis and in a direction from a terminating end of the preceding segmented route toward a starting end of the preceding segmented route; set the entire slid arc as a new segmented route; and change the coordinates of the terminating end of the preceding segmented route to the coordinates of a starting end of the slid arc.

6 Claims, 7 Drawing Sheets

SETTING DEVICE AND SETTING METHOD OF TRAVELING ROUTE

CROSS-REFERENCE TO RELATED APPLICATION

This application claims priority to Japanese Patent Application No. 2020-017792 filed on Feb. 5, 2020, incorporated herein by reference in its entirety.

BACKGROUND

1. Technical Field

The disclosure relates to a device and a method for setting a traveling route of a vehicle.

2. Description of Related Art

Japanese Unexamined Patent Application Publication No. 10-264839 (JP 10-264839 A) discloses a device for executing automatic parking control of a vehicle. In the automatic parking control, a guide route from an initial position near a parking position to a parking position is calculated. A radius of the guide route is set to be equal to or larger than the minimum turning radius of the vehicle.

SUMMARY

In an automated valet parking (AVP) in a parking lot, a control center that controls the parking lot provides the vehicle with information relating to a node. The "node" means a position where a vehicle should pass through on a traveling route in the parking lot. The information relating to the node includes position information of the node expressed by numerical values of a two-dimensional relative coordinate system. The vehicle sets the traveling route in the parking lot based on the position information.

In the traveling route, the radius of a segmented route between adjacent segmented routes may be set to be equal to or larger than the minimum turning radius, similar to the radius of the guide route described above. However, in a complicated place of a narrow parking lot, there is a possibility that a traveling route that locally includes the segmented route having a radius smaller than the minimum turning radius is calculated. Therefore, improvement is required to avoid such an inappropriate traveling route being set as itis.

The disclosure provides a technique capable of setting an appropriate traveling route based on the information relating to the node.

A first aspect of the present disclosure is a setting device of a traveling route, the setting device configured to set the traveling route of a vehicle along a node between a departure point and a destination point. The setting device includes a memory and a processor. The memory stores map information having position information of the node in a two-dimensional coordinate system. The processor is configured to execute processing of calculating a segmented route between a plurality of the nodes that are adjacent to each other based on the map information. In the processing of calculating the segmented route, the processor is configured to determine whether a target route indicating the segmented route that is a target of the processing of calculating the segmented route is curved based on the map information, determine whether a radius of curvature of the target route is less than a minimum turning radius of the vehicle when the target route is determined to be curved, determine whether a preceding segmented route that is connected to a starting end of the target route exists before the starting end when the radius of curvature is determined to be less than the minimum turning radius, and set an arc having a sector shape, including coordinates of the starting end of the target route as a starting end of the arc and being curved in the same direction as a curved direction of the target route when the preceding segmented route is determined to exist. Here, a radius of the sector shape is equal to the minimum turning radius. A center of the sector shape is positioned on a reference line that passes through the coordinates of the starting end of the target route and central coordinates of a circle having the radius of curvature as a radius. A central angle of the sector shape is equal to an angle between the reference line and a straight line that passes through the coordinates of the terminating end of the target route and the central coordinates. In the processing of calculating the segmented route, the processor is configured to calculate an end-to-end distance from coordinates of a terminating end of the target route to coordinates of the terminating end of the arc in a direction of a coordinate axis in which the preceding segmented route extends, cause the entire arc to slide by an amount corresponding to the end-to-end distance in a direction parallel to the coordinate axis and in a direction from a terminating end of the preceding segmented route toward a starting end of the preceding segmented route, set the entire slid arc as a new segmented route in place of the target route, and change the coordinates of the terminating end of the preceding segmented route to the coordinates of the starting end of the slid arc.

In the first aspect, in the processing of calculating the segmented route, the processor may be is configured to: determine whether a subsequent segmented route that is connected to the terminating end of the target route exists ahead of the terminating end when the radius of curvature is determined to be less than the minimum turning radius; and change coordinates of a starting end of the subsequent segmented route to the coordinates of the terminating end of the slid arc when the subsequent segmented route is determined to exist.

According to the configuration above, the coordinates of the starting end of the subsequent segmented route are changed to the coordinates of the terminating end of the slid arc. With the change above, three continuous segmented routes, that is, the preceding segmented route, the target route, and the subsequent segmented route can be appropriately set.

In the first aspect, the map information may have obstacle information about an obstacle around the node. In the processing of calculating the segmented route, the processor may be configured to: determine whether an obstacle positioned at coordinates at which a distance from the slid arc is equal to or less than a predetermined value exists based on the obstacle information, calculate an involvement distance during a virtual traveling of the vehicle along the slid arc when the obstacle is determined to exist, and after causing the entire arc to slide by the amount corresponding to the end-to-end distance and before setting the new segmented route, cause the entire arc to slide by an amount corresponding to the involvement distance in the direction from the starting end of the preceding segmented route toward the terminating end of the preceding segmented route.

According to the configuration above, when a certain condition relating to the slid arc having a sector shape is satisfied, the entire arc having the sector shape can be caused to slide by the amount corresponding to the involvement distance in the direction from the starting end toward the terminating end of the preceding segmented route. The sliding movement is performed before setting a new segmented route after the entire arc is caused to slide by the amount corresponding to the end-to-end distance. Accordingly, setting of an inappropriate segmented route as a new segmented route can be avoided.

A second aspect of the disclosure is a setting method of a traveling route to set the traveling route of a vehicle along a node between a departure point and a destination point. The method includes a step of calculating a segmented route between a plurality of the nodes adjacent to each other based on map information having position information of the node in a two-dimensional coordinate system. The step of calculating the segmented route has: a step of determining whether a target route indicating the segmented route that is a target of the step of calculating the segmented route is curved based on the map information, a step of determining whether a radius of curvature of the target route is less than a minimum turning radius of the vehicle when the segmented route is determined to be curved; a step of determining whether a preceding segmented route that is connected to a starting end of the target route exists before the starting end when the radius of curvature is determined to be less than the minimum turning radius; and a step of setting an arc having a sector shape, including coordinates of the starting end of the target route as a starting end of the arc and being curved in the same direction as a curved direction of the target route when the preceding segmented route is determined to exist. Here, a radius of the sector shape is equal to the minimum turning radius. A center of the sector shape is positioned on a reference line that passes through the coordinates of the starting end of the target route and central coordinates of a circle having the radius of curvature as a radius. A central angle of the sector shape is equal to an angle between the reference line and a straight line that passes through the coordinates of the terminating end of the target route and the central coordinates. The step of calculating the segmented route includes a step of calculating an end-to-end distance from coordinates of a terminating end of the target route to coordinates of the terminating end of the arc in a direction of a coordinate axis in which the preceding segmented route extends; a step of causing the entire arc to slide by an amount corresponding to the end-to-end distance in a direction parallel to the coordinate axis and in a direction from a terminating end of the preceding segmented route toward the starting end of the preceding segmented route; a step of setting the entire slid arc as a new segmented route in place of the target route; and a step of changing the coordinates of the terminating end of the preceding segmented route to the coordinates of the starting end of the slid arc.

In the second aspect, the step of calculating the segmented route may have: a step of determining whether a subsequent segmented route that is connected to the terminating end of the target route ahead of the terminating end exists when the radius of curvature is determined to be less than the minimum turning radius; and a step of changing coordinates of a starting end of the subsequent segmented route to the coordinates of the terminating end of the slid arc (AR) when the subsequent segmented route is determined to exist.

According to the configuration above, the coordinates of the starting end of the subsequent segmented route are changed to the coordinates of the terminating end of the slid arc. With the change above, three continuous segmented routes, that is, the preceding segmented route, the target route, and the subsequent segmented route can be appropriately set.

In the second aspect, the map information may further have obstacle information about an obstacle around the node. The step of calculating the segmented route may have: a step of determining whether an obstacle positioned at coordinates at which a distance from the slid arc is equal to or less than a predetermined value exists based on the obstacle information; a step of calculating an involvement distance during a virtual traveling of the vehicle along the slid arc when the obstacle is determined to exist; and after causing the entire arc to slide by the amount corresponding to the end-to-end distance and before setting the new segmented route, and a step of causing the entire arc to slide by an amount corresponding to the involvement distance in the direction from the starting end of the preceding segmented route toward the terminating end of the preceding segmented route.

According to the configuration above, when a certain condition relating to the slid arc having a sector shape is satisfied, the entire arc having the sector shape can be caused to slide by the amount corresponding to the involvement distance in the direction from the starting end toward the terminating end of the preceding segmented route. The sliding movement is performed before setting a new segmented route after the entire arc is caused to slide by the amount corresponding to the end-to-end distance. Accordingly, setting of an inappropriate segmented route as a new segmented route can be avoided.

According to the first and second aspects, when a certain condition relating to the target route is satisfied, the arc having a sector shape is set. Here, the radius of the sector is equal to the minimum turning radius. Further, the center of the sector shape is located on the reference line that passes through the coordinates of the starting end of the target route and the central coordinates of a circle having the radius of curvature as its radius. The central angle of the sector shape is equal to the angle between the straight line passing through the coordinates of the terminating end of the target route and the central coordinates, and the reference line. In other words, the arc having a sector shape corresponds to a traveling trajectory of the vehicle when the vehicle makes a turn with the minimum turning radius starting from the starting end of the target route at an angle that is the same as a turning angle when the vehicle makes a turn along the target route.

According to the first and second aspects, the entire arc having a sector shape is caused to slide by the amount corresponding to the end-to-end distance in the direction parallel to the coordinate axis in which the preceding segmented route extends and in the direction from the terminating end toward the starting end of the preceding segmented route. In addition, the entire slid arc is set as a new segmented route in place of the target route. Further, the coordinates of the terminating end of the preceding segmented route are changed to the coordinates of the starting end of the slid arc. Performing a series of corrections makes it possible to avoid that the traveling route including the segmented route having a radius that is less than the minimum turning radius is set. That is, it is possible to set an appropriate traveling route.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a setting device and a setting method of the traveling route according to embodiments of the disclosure will be described with reference to the drawings.

1. First Embodiment

Hereinafter, a first embodiment of the disclosure will be described with reference to FIGS. 1 to 11.

1-1. Application Example

Figure 1:
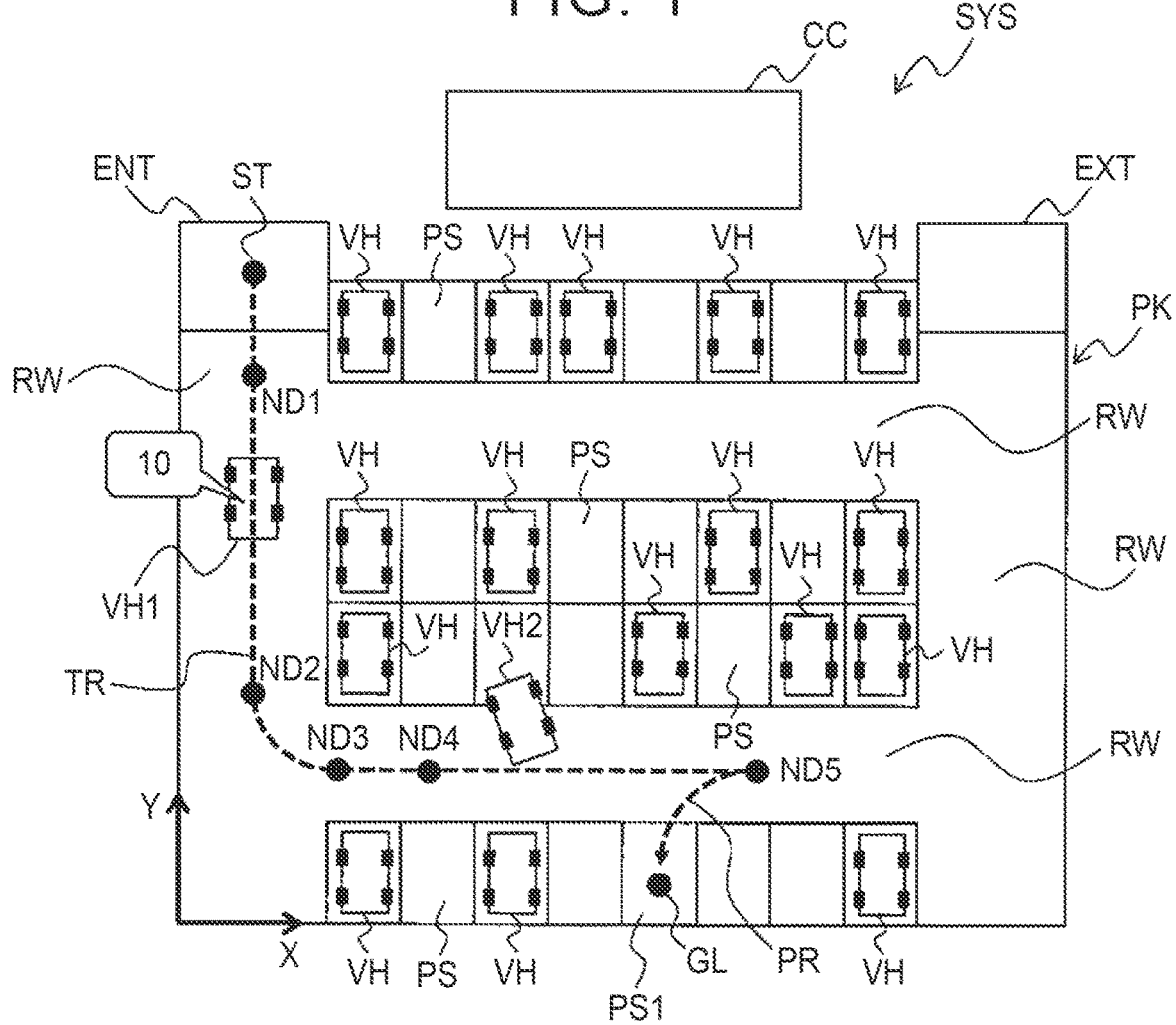
FIG. 1 is a diagram for explaining an outline of an AVP system.

A setting device according to the first embodiment is applied to a system that sets a traveling route of a vehicle along a node between a departure point and a destination point. The setting method according to the first embodiment may be implemented in the setting system as described above. An AVP system is exemplified as the setting system above. FIG. 1 is a diagram for explaining an outline of the AVP system. As shown in FIG. 1, an AVP system SYS is a system for controlling the AVP in a parking lot PK. The AVP system SYS includes the parking lot PK and a control center CC.

The parking lot PK is used at least for parking of a vehicle VH supporting AVP. The parking lot PK may be used for parking general vehicles other than the vehicle VH. The parking lot PK includes an entrance ENT, an exit EXT, a plurality of runways RW, and a plurality of parking spaces PS. The entrance ENT is provided with a drop-off space. The exit EXT is provided with a pick-up space. The position of the entrance ENT may be the same as the position of the exit EXT. A positional reference (for example, a marker) for guiding the vehicle VH may be installed on the runway RW. The parking space PS is a space in which the vehicle VH and general vehicles are parked. The parking spaces PS are separated by marking lines.

The control center CC grasps a usage status of the parking lot PK (for example, vacancy status and congestion status). The control center CC also monitors movement and state of the vehicle VH using cameras and sensors installed in the parking lot PK. Further, the control center CC communicates with the vehicle VH. For example, the control center CC manages the entry of the vehicle VH from the drop-off space to the parking space PS and the exit from the parking space PS to the exit EXT. Management of the entry and the exit of the vehicle VH includes management of autonomous driving of the vehicle VH on the runway RW. The processing for autonomous driving is basically executed by an AVP assistance device 10 (details will be described later) mounted on the vehicle VH. However, the control center CC may remotely control the vehicle VH via communication. In this case, the processing for autonomous driving may be executed in the control center CC.

In the example shown in FIG. 1, a vehicle VH1 that is in the process of parking is drawn on the runway RW. The control center CC sets a parking space PS (PS1) for the vehicle VH1 based on the usage status of the parking lot PK before starting a parking operation of the vehicle VH1. The control center CC then provides the vehicle VH1 with information relating to a plurality of nodes ND on the runway RW between a departure position ST and an arrival position GL.

Nodes ND1 to ND5 shown in FIG. 1 are examples of the node ND. The nodes ND1, ND2 are respectively set at the entrances of intersections of the runway RW. The node ND2 is also positioned at the beginning of a curve. The node ND3 is provided at a terminating end of the curve. The node ND4 is provided in front of a position where interference of the vehicle VH1 with another vehicle VH2 that is in the process of parking is predicted. The node ND5 is provided near the parking space PS1. A route from the node ND1 to the node ND5 corresponds to a traveling route TR of the vehicle VH1 in the parking lot PK. The vehicle VH1 autonomously travels on the traveling route TR generated based on information NOD relating to the node ND.

Figure 2:
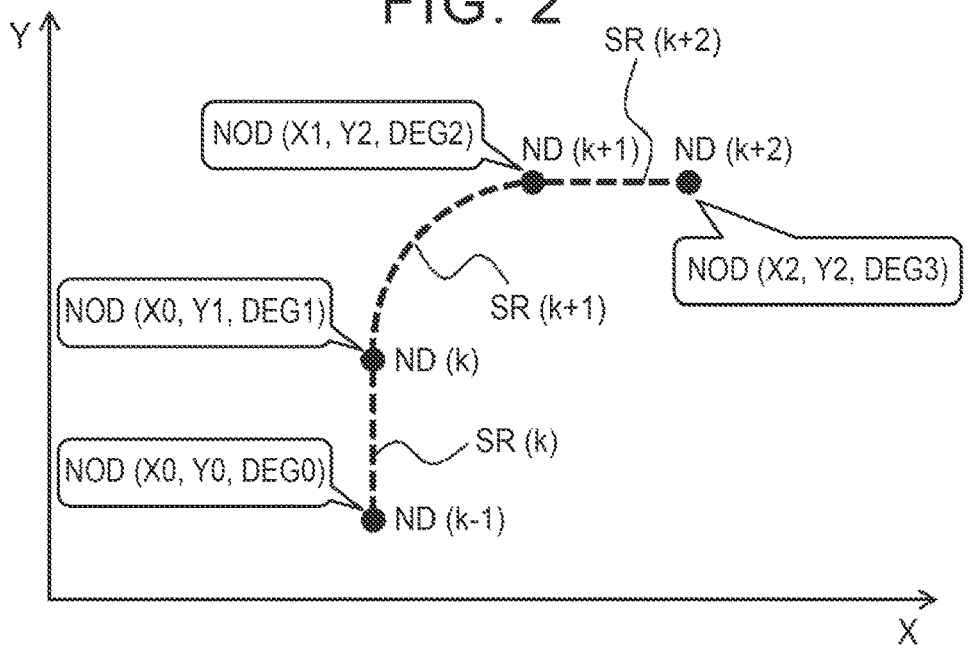
FIG. 2 is a diagram illustrating an example of information relating to nodes.

FIG. 2 is a diagram illustrating an example of the information NOD. In the example shown in FIG. 2, the vehicle VH is scheduled to pass through the node ND(k−1), the node ND(k), the node ND(k+1), and the node ND(k+2) in this order. As shown in FIG. 2, the information NOD is set for each node ND. The information NOD includes position information (X, Y) and angle information DEG. Information on the order of passing through the nodes ND and information on possible passage time of the node ND may be added to the information NOD. Note that, the possible passage time is a time when the vehicle VH can pass through the node ND, and has a certain time width.

The position information (X, Y) is represented by numerical values in the relative coordinate system. In the example shown in FIG. 2, the information about the node ND(k−1) includes the position information (X0, Y0). A segmented route SR(k) from the node ND(k−1) to the node ND(k) extends parallel to the Y axis. Therefore, the position information (X, Y) in the node ND(k) is represented by the numerical values of the coordinates (X0, Y1) (Y1 Y0).

The segmented route SR(k+1) from the node ND(k) to the node ND(k+1) is curved. Therefore, the position information (X, Y) in the node ND(k+1) is represented by the numerical values of the coordinates (X1, Y2) (X1≠X0, Y2≠Y1). A segmented route SR(k+2) from the node ND(k−1) to the node ND(k+2) extends parallel to the Y axis. Therefore, the position information (X, Y) in the node ND(k+2) is represented by the numerical values of the coordinates (X2, Y2) (X2≠X1).

Figure 3:
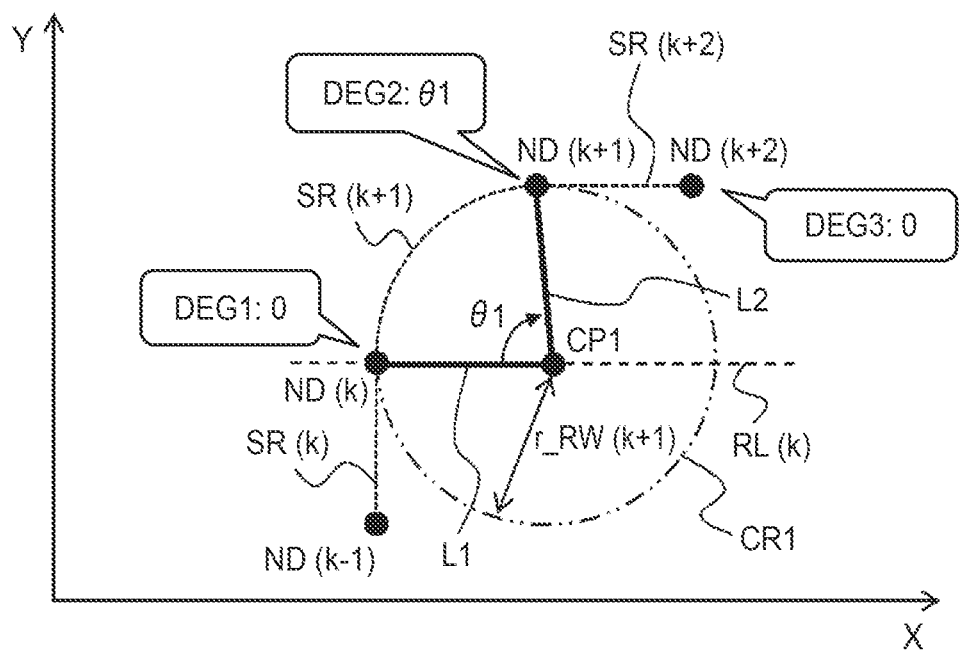
FIG. 3 is a diagram illustrating an example of setting angle information.

Angle information DEG is represented by a relative angle based on the node ND that constitutes one end of the segmented route SR. FIG. 3 is a diagram illustrating an example of setting angle information. In the example shown in FIG. 3, angle information DEG1, angle information DEG2, and angle information DEG3 are represented by relative angles based on starting ends of the segmented routes SR(k) to (k+1).

In the parking lot PK, a location where the runway RW curves and its radius of curvature r_SR are known. In the example shown in FIG. 3, the segmented route SR(k+1) corresponds to the location where the runway RW curves. Here, a radius of curvature r_SR(k+1) of the segmented route SR(k+1) is considered. Coordinates distant from the coordinates (X0, Y1) of the node ND(k) by an amount corresponding to the radius of curvature r_SR(k+1) are set on a reference line RL(k) that passes through the node ND(k) and is parallel to the X axis (that is, a straight line that satisfies y=Y1). The coordinates above correspond to the coordinates of a center CP1 of a circle CR1 having a radius equal to the radius of curvature r_SR(k+1).

Further, a line segment L1 having the center CP1 and the node ND(k) as end points and a line segment L2 having the center CP1 and the node ND(k+1) as end points are considered. The relative angle based on the starting end of the segmented route SR(k+1) (that is, the coordinates (X0, Y1) of the node ND(k)) is represented by an angle θ1 between a line segment L1 and a line segment L2. The angle θ1 is the angle information DEG2.

On the other hand, the segmented route SR(k) is not curved. Therefore, the angle information DEG1 based on the starting end of the segmented route SR(k) (that is, the coordinates (X0, Y0) of the node ND(k−1)) is 0. The segmented route SR(k+2) is also not curved. Therefore, the angle information DEG3 based on the starting end of the segmented route SR(k+2) (that is, the coordinates (X1, Y2) of the node ND(k+1)) is also 0.

1-2. Setting Device and Setting Method

The AVP assistance device 10 shown in FIG. 1 corresponds to a setting device according to the first embodiment. A setting method according to the first embodiment is realized by the AVP assistance device 10 executing processing of setting the traveling route TR. Hereinafter, a configuration example related to the AVP assistance device 10 and a configuration example for the AVP assistance device 10 to execute the processing of setting the traveling route TR will be described with reference to FIGS. 4 and 5.

1-2-1. Configuration Example of Setting Device

Figure 4:
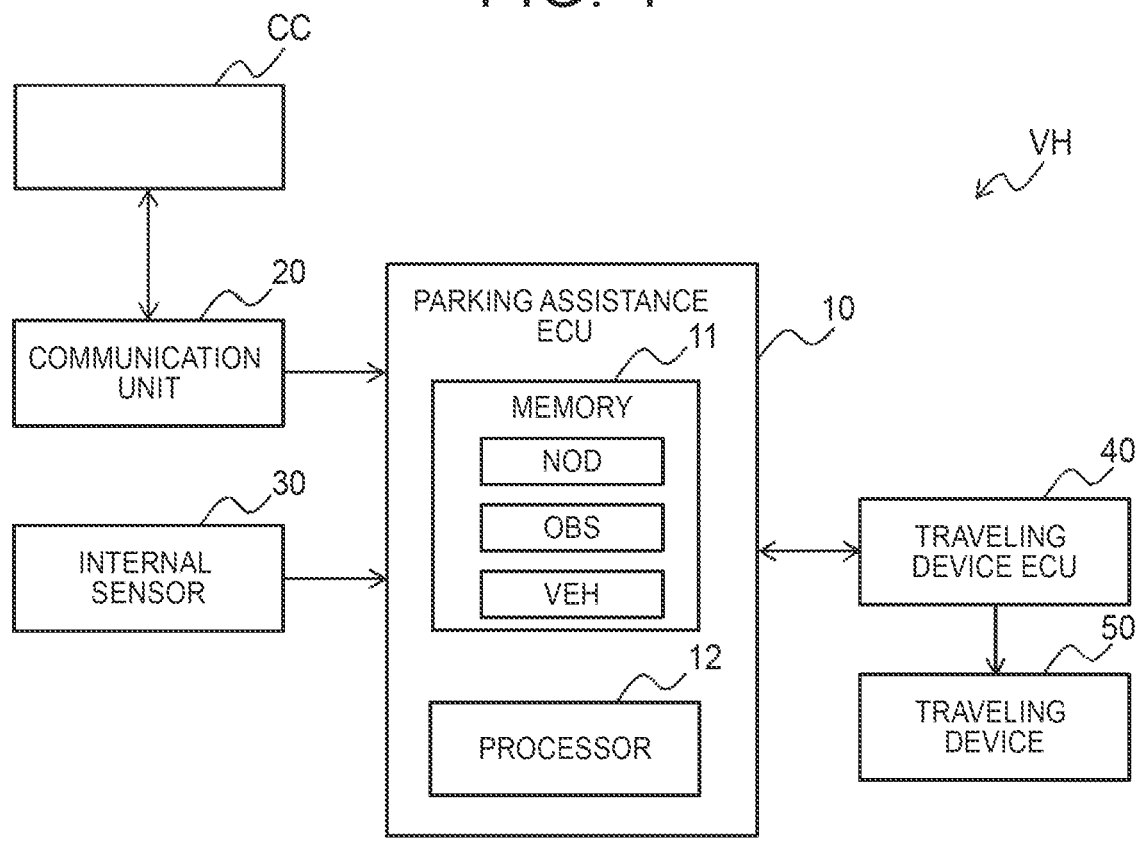
FIG. 4 is a block diagram illustrating a configuration example related to an AVP assistance device.

FIG. 4 is a block diagram illustrating a configuration example related to the AVP assistance device 10. FIG. 4 is also a diagram illustrating a configuration example for the AVP assistance device 10 to execute the processing of setting the traveling route TR. As shown in FIG. 4, the AVP assistance device 10 is mounted on the vehicle VH as a parking assistance electronic control unit (ECU). The parking assistance ECU is typically a microcomputer including a processor, a memory, and an input-output interface. FIG. 4 shows a memory 11 and a processor 12 of the elements above.

The memory 11 stores the information NOD relating to the node ND described above. The memory 11 also stores information OBS relating to an obstacle OB in the parking lot PK. The information OBS includes information on type of the obstacle OB and position information (X, Y) of the obstacle OB. Examples of the type of the obstacle OB include structures of the parking lot PK (for example, pillars, walls, and braces), facilities of the parking lot PK (for example, sensors and cameras), and other vehicles in the parking lot PK. Information on a height direction may be added to the position information (X, Y). The information OBS may be limited to information on the obstacle OB around the runway RW.

The information NOD and the information OBS are examples of "map information" in the disclosure. The information NOD and the information OBS are acquired by a communication device 20 included in the vehicle VH. The control center CC serves as a transmission source of the information NOD and the information OBS. The control center CC sequentially updates the information NOD and the information OBS and transmits the updated information to the vehicle VH. The AVP assistance device 10 stores the latest information NOD and information OBS received by the communication device 20 in the memory 11.

The memory 11 also stores information VEH relating to a traveling state of the vehicle VH. Examples of the information VEH include information on a traveling speed, acceleration, and a yaw rate of the vehicle VH. The information VEH is acquired by an internal sensor 30 included in the vehicle VH. A wheel speed sensor is exemplified as the internal sensor 30 that acquires the traveling speed. An acceleration sensor is exemplified as the internal sensor 30 that acquires the acceleration. A yaw rate sensor is exemplified as the internal sensor 30 that acquires the yaw rate. The internal sensor 30 sequentially transmits the information VEH to the vehicle VH. The AVP assistance device 10 stores the received latest information VEH in the memory 11.

The memory 11 further stores a program necessary for executing AVP control based on the information NOD, the information OBS, and the information VEH. The processor 12 reads the program from the memory 11 and executes processing for executing the AVP control. The AVP control includes autonomous driving control and automatic parking control. When the autonomous driving control is executed, various control amounts required for traveling along the traveling route TR are calculated. When the automatic parking control is executed, various control amounts required for parking along a parking route PR are calculated. The parking route PR is a route from the position of the node ND that constitutes the terminating end of the traveling route TR to the parking position. Since the AVP control itself is publicly known, detailed description thereof is omitted herein.

The various control amounts calculated by the processor 12 are transmitted to a traveling device ECU 40. The traveling device ECU 40 is a microcomputer having the same configuration as the parking assistance ECU. The traveling device ECU 40 includes a plurality of ECUs. The ECUs execute various types of processing required to operate a traveling device 50 in accordance with the information input from the parking assistance ECU. The traveling device 50 is an electronically controlled device, and includes a traveling driving force output device, a steering device, and a braking device. The traveling driving force output device is a power source (for example, an internal combustion engine or an electric motor) that generates a traveling driving force. The steering device steers the wheels. The braking device generates a braking force.

1-2-2. Example of Functional Configuration of Setting Device

Figure 5:
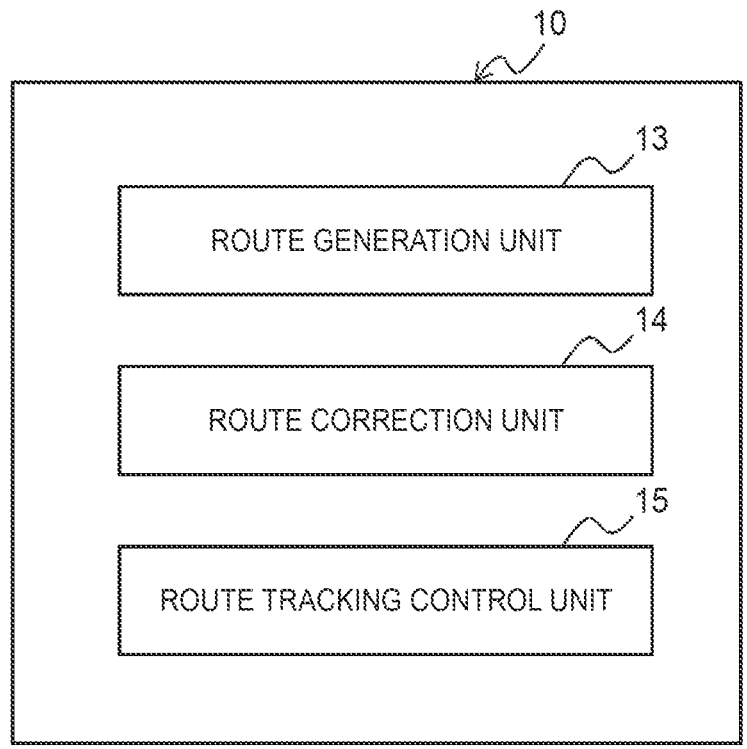
FIG. 5 is a block diagram illustrating a functional configuration example of the AVP assistance device.

FIG. 5 is a block diagram illustrating a functional configuration example of the AVP assistance device 10. As shown in FIG. 5, the AVP assistance device 10 includes a route generation unit 13, a route correction unit 14, and a route tracking control unit 15. Note that, the functions are realized by the processor 12 described in FIG. 4 executing the program for the autonomous driving control that is stored in the memory 11.

The route generation unit 13 executes processing of generating the traveling route TR and the parking route PR based on the information NOD and the information OBS. In the generation processing of the traveling route TR, the segmented route SR is generated by connecting the nodes ND that are adjacent to each other, and the segmented routes SR are further connected. For example, when the numerical values of the positional information (X, Y) at the terminating end of a certain segmented route SR and the numerical values of the positional information (X, Y) at the starting end of another segmented route SR match each other, the segmented routes SR are connected. When the information NOD includes information on the order of passing through the nodes ND, the segmented routes SR may be connected in accordance with the order of passing. The connected segmented routes SR is the traveling route TR.

In the processing of generating the parking route PR, the node ND that constitutes the terminating end of the traveling route TR and the parking position are connected. The route after the connection is the parking route PR. The route generation unit 13 transmits the generated information on the segmented route SR, the traveling route TR, and the parking route PR to the route correction unit 14.

The route correction unit 14 executes processing of correcting the traveling route TR based on a minimum turning radius r_VH of the vehicle VH and the information received from the route generation unit 13. The minimum turning radius r_VH is a value unique to the vehicle VH. Details of the correction processing of the traveling route TR will be described later. When the correction processing is executed, the route correction unit 14 transmits the information on the corrected traveling route TR to the route tracking control unit 15 together with the information on the parking route PR. Otherwise, the route correction unit 14 transmits the information received from the route generation unit 13 to the route tracking control unit 15 as it is.

The route tracking control unit 15 executes the AVP control (that is, the autonomous driving control and the automatic parking control) based on the information received from the route correction unit 14. The route tracking control unit 15 executes the autonomous driving control to calculate various control amounts required for traveling along the traveling route TR. The route tracking control unit 15 executes the automatic parking control to calculate various control amounts required for parking along the parking route PR. The route tracking control unit 15 transmits the calculated various control amounts to the traveling device ECU 40 (see FIG. 4).

1-2-3. Traveling Route Correction Processing

Figure 6:
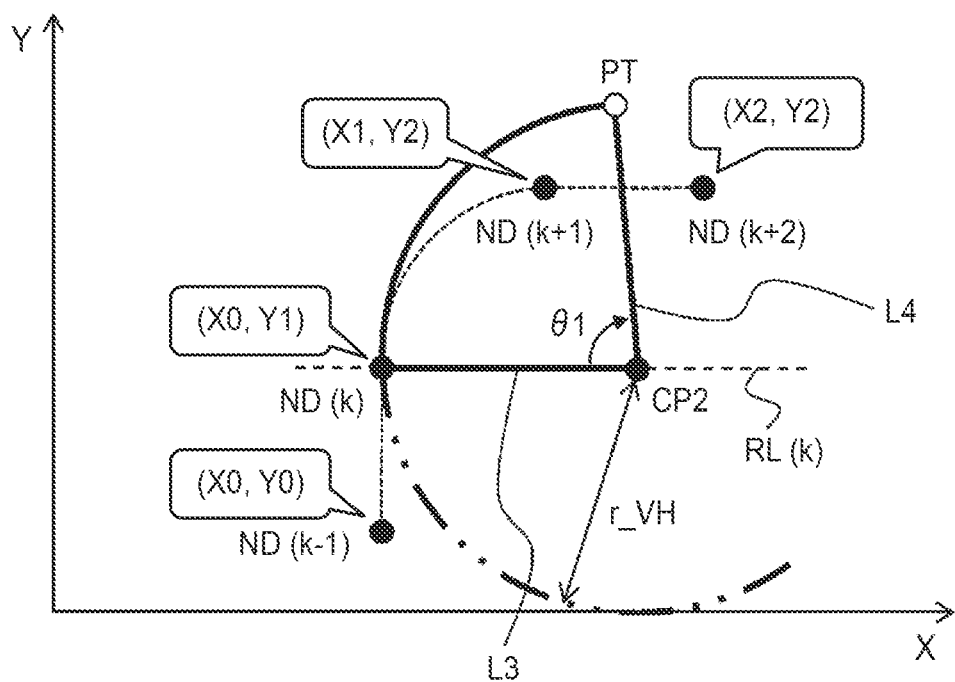
FIG. 6 is a diagram illustrating an example of traveling route correction processing according to a first embodiment.
Figure 7:
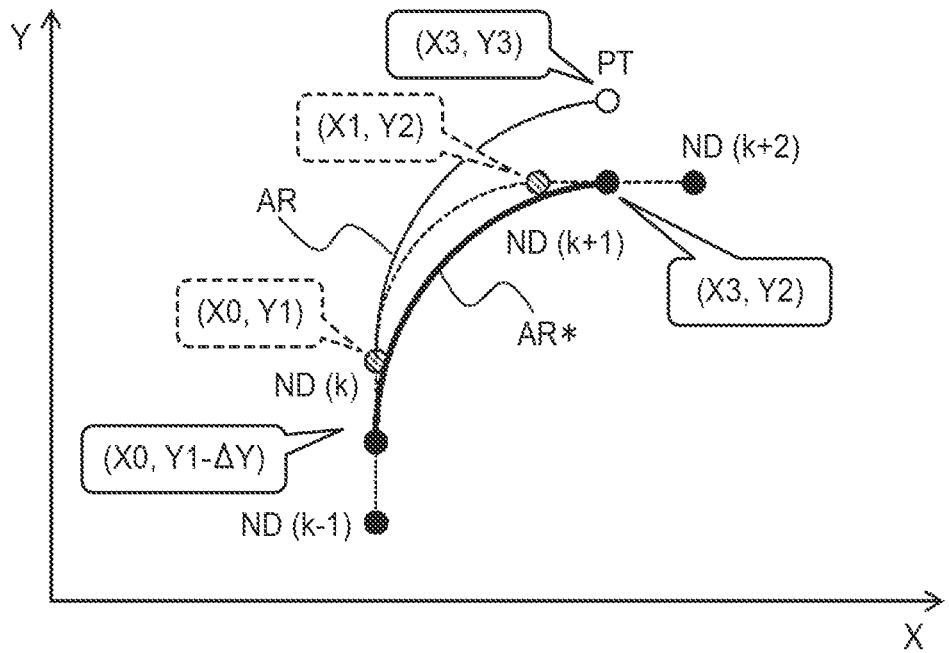
FIG. 7 is a diagram illustrating the example of the traveling route correction processing according to the first embodiment.
Figure 8:
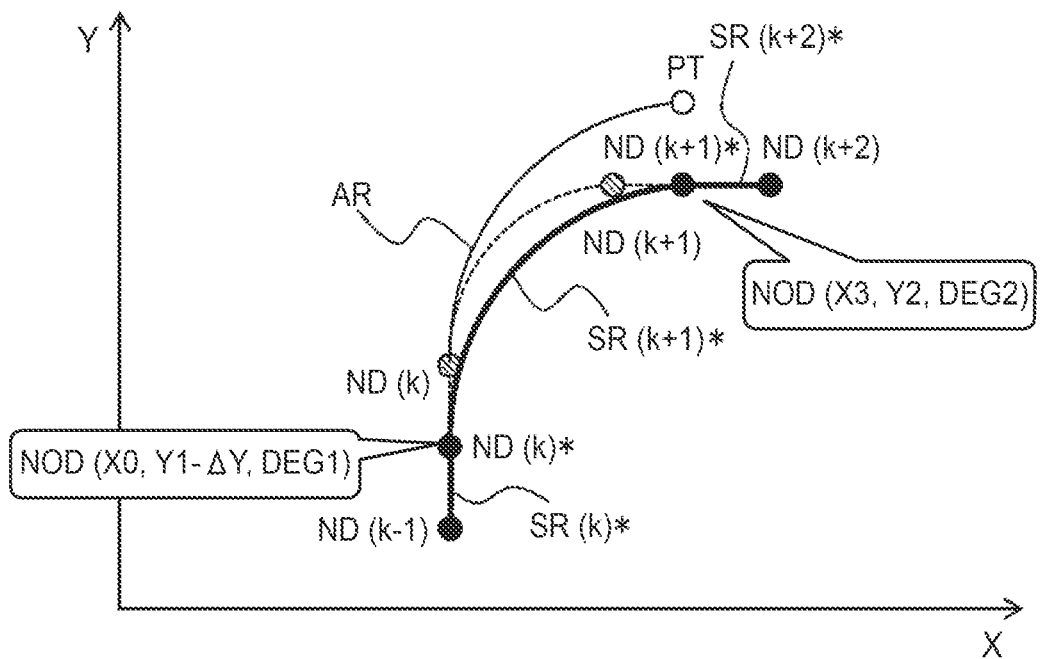
FIG. 8 is a diagram illustrating the example of the traveling route correction processing according to the first embodiment.

FIGS. 6 to 8 are diagrams illustrating an example of processing of correcting the traveling route TR. FIG. 6 shows the nodes ND(k−1) to ND(k+2) described in FIG. 2 and the reference line RL(k). As described in the description of FIG. 3, the segmented route SR(k+1) corresponds to the location where the runway RW curves. The segmented route SR(k+1) is hereby focused.

In the example shown in FIG. 6, a case where the radius of curvature r_SR(k+1) is less than the minimum turning radius r_VH is considered. In this case, the vehicle VH cannot make a turn along the segmented route SR(k+1). Therefore, an arc AR that curves in the same direction as a curved direction of the segmented route SR(k+1) is set with the coordinates (X0, Y1) of the node ND(k) as its starting point.

The arc AR is a sector-shaped arc having a center CP2 on the reference line RL(k) and a radius equal to the minimum turning radius r_VH. The central angle of the sector shape is equal to the angle θ1. The coordinates of the center CP2 correspond to the coordinates that are distant from the coordinates (X0, Y1) of the node ND(k) by the minimum turning radius r_VH on the reference line RL(k). The coordinates of the point PT can be obtained by, for example, calculating coordinates at which an angle between a line segment L3 having the center CP2 and the node ND(k) as end points and a line segment L4 having the center CP2 and the point PT as end points matches the angle θ1.

In the processing of correcting the traveling route TR, the arc AR is set when the curvature radius r_SR(k+1) is less than the minimum turning radius r_VH. In the processing of correcting the traveling route TR, the entire arc AR is further caused to slide in a direction from the terminating end of the segmented route SR(k) to the starting end (negative direction of the Y axis in the example shown in FIG. 6). A distance between the coordinates of the terminating end of the point PT and the coordinates of the node ND(k+1) in a direction of a coordinate axis (that is, the Y axis) along which the segmented route SR(k) extends (the distance is hereinafter also referred to as an "end-to-end distance") is set as a movement amount.

FIG. 7 shows the arc AR before sliding and an arc AR* after sliding. When the entire arc AR is caused to slide, the coordinates of the starting end of the arc AR (that is, the coordinates of the node ND(k)) move from the coordinates (X0, Y1) to the coordinates (X0, Y1−ΔY). Further, the coordinates of the terminating end of the arc AR (that is, the coordinates of the point PT) move from the coordinates (X3, Y3) to the coordinates (X3, Y2). Here, the segmented route SR(k) extends in parallel to the Y axis. Therefore, an end-to-end distance ΔY that is set along the Y axis is represented as a difference between the Y coordinate (Y3) of the point PT and the Y coordinate (Y2) of the node ND(k+1) (ΔY=Y3−Y2).

In the processing of correcting the traveling route TR, the segmented route SR(k+1) is further replaced using the arc AR*. FIG. 8 shows the replaced segmented route SR(k+1) as "segmented route SR(k+1)*". The segmented route SR(k+1)* is an example of "new segmented route" in the disclosure.

In the processing of correcting the traveling route TR, the coordinates of the terminating end of the segmented route SR(k) are replaced using the coordinates of the starting end of the segmented route SR(k+1)*. That is, the coordinates of the terminating end of the segmented route SR(k) are replaced with the coordinates (X0, Y1−ΔY) of the replaced node ND(k)*. In the processing of correcting the traveling route TR, the coordinates of the starting end of the segmented route SR(k+2) are replaced using the coordinates of the terminating end of the segmented route SR(k+1)*. That is, the coordinates of the starting end of the segmented route SR(k+2) are replaced with the coordinates (X3, Y2) of the replaced node ND(k+1)*.

FIG. 8 shows the replaced segmented route SR(k) as "segmented route SR(k)*". A length of the segmented route SR(k)* is shortened by the end-to-end distance ΔY from a length of the segmented route SR(k). FIG. 8 also shows the replaced segmented route SR(k+2) as "segmented route SR(k+2)*". A length of the segmented route SR(k+2)* is shortened by an amount corresponding to a distance ΔX from a length of the segmented route SR(k+2). The distance ΔX is a distance between the coordinates of the terminating end of the point PT and the coordinates of the node ND(k+1) in a direction of the coordinate axis (i.e., X axis) orthogonal to the coordinate axis (i.e., Y axis) in which the segmented route SR(k) extends (ΔX=X3−X1). In the processing of correcting the traveling route TR, the segmented routes SR(k)*, SR(k+1)* and SR(k+2)* are connected. Through the correction processing above, a part of or entire traveling route TR is corrected.

Figure 9:
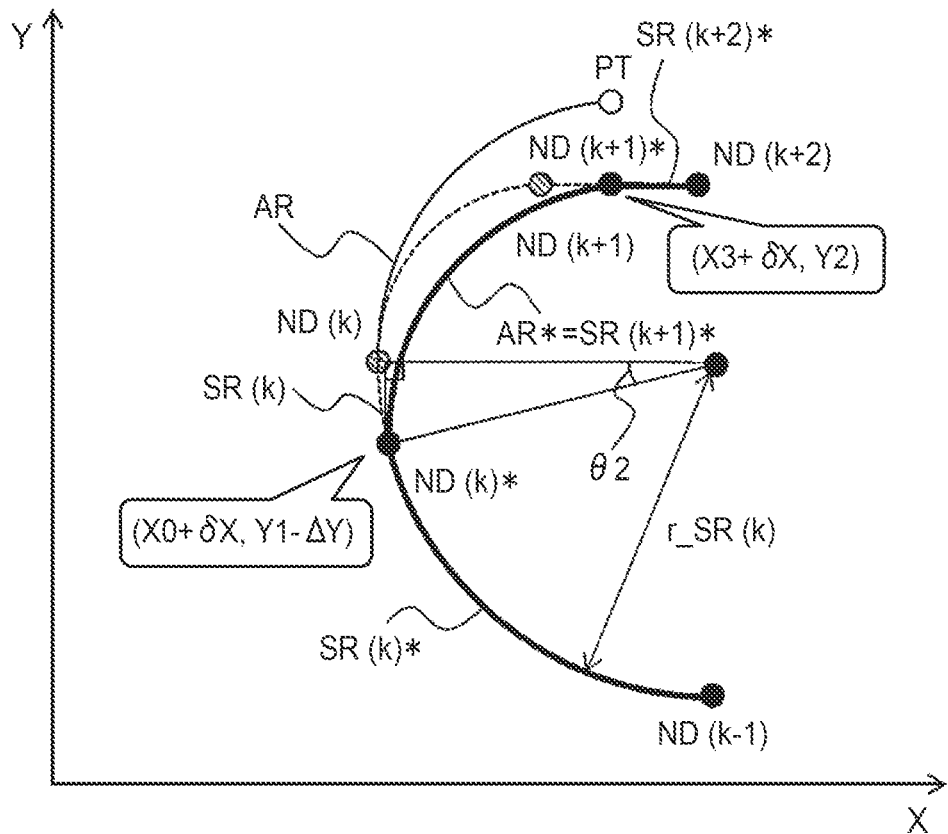
FIG. 9 is a diagram illustrating another example of the traveling route correction processing according to the first embodiment.

FIG. 9 is a diagram illustrating another example of the processing of correcting the traveling route TR. The segmented route SR(k) from the node ND(k−1) to the node ND(k) is curved to the right in the example shown in FIG. 9. However, in the example shown in FIG. 9, a case where the radius of curvature r_SR(k) is equal to or larger than the minimum turning radius r_VH is considered. Therefore, a target of the processing of correcting the traveling route TR is the segmented route SR(k+1) as in the example shown in FIG. 6. That is, the example of FIG. 6 differs from the example of FIG. 9 only in the shape of the segmented route SR(k).

Similar to the example shown in FIG. 6, also in the example shown in FIG. 9, the entire arc AR is caused to slide in the direction from the terminating end to the starting end of the segmented route SR(k) (that is, the negative direction of the Y axis and the curve direction of the segmented route SR(k)). As a result of the above, the coordinates of the starting end and the terminating end of the arc AR move. The coordinates of the starting end of the arc AR* are coordinates (X0+δX, Y1−ΔY). The coordinates of the terminating end of the arc AR* are coordinates (X3+δX, Y2). A movement amount δX is obtained by, for example, performing calculation based on Equation (1) below using the radius of curvature r_SR(k) of the segmented route SR(k).

$$\delta X = r\_SR(k)(1-\cos\theta 2) \quad (1)$$

However, θ is θ2 that satisfies Equation (2) below.

$$\Delta Y = r\_SR(k)\sin\theta 2 \quad (2)$$

The processing subsequent to the replacement of the segmented route SR(k+1) using the arc AR* is the same as the example shown in FIG. 6. Therefore, also in the example shown in FIG. 9, a part or entire traveling route TR is corrected.

Figure 10:
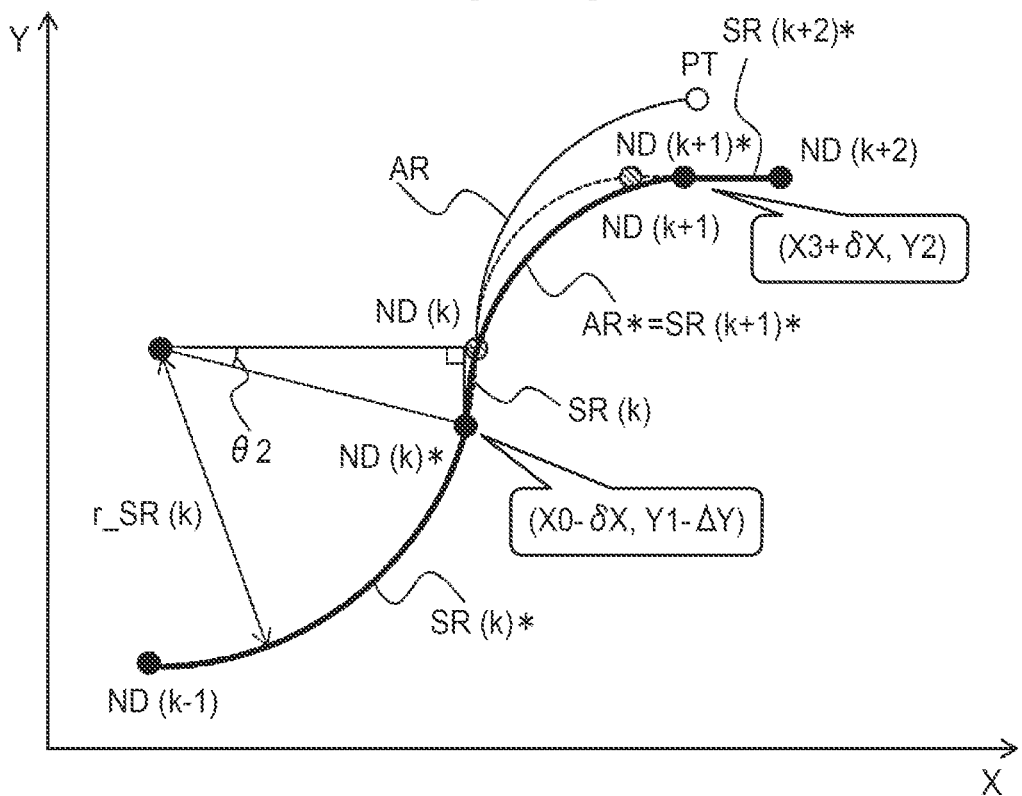
FIG. 10 is a diagram illustrating still another example of the traveling route correction processing according to the first embodiment.

FIG. 10 is a diagram illustrating still another example of the processing of correcting the traveling route TR. The segmented route SR(k) from the node ND(k−1) to the node ND(k) is curved to the left in the example shown in FIG. 10. Other points are the same as those in the example shown in FIG. 6.

Similar to the examples shown in FIGS. 6 and 9, also in the example shown in FIG. 10, the entire arc AR is caused to slide in the direction from the terminating end to the starting end of the segmented route SR(k) (that is, the negative direction of the Y axis and the curve direction of the segmented route SR(k)). As a result of the above, the coordinates of the starting end and the terminating end of the arc AR move. The coordinates of the starting end of the arc AR* are coordinates (X0−δX, Y1−ΔY). The coordinates of the terminating end of the arc AR* are coordinates (X3+δX, Y2). The movement amount δX is as described in FIG. 9.

The processing subsequent to the replacement of the segmented route SR(k+1) using the arc AR* is the same as the example shown in FIG. 6. Therefore, also in the example shown in FIG. 10, a part or entire traveling route TR is corrected.

1-2-4. Specific Processing

Figure 11:
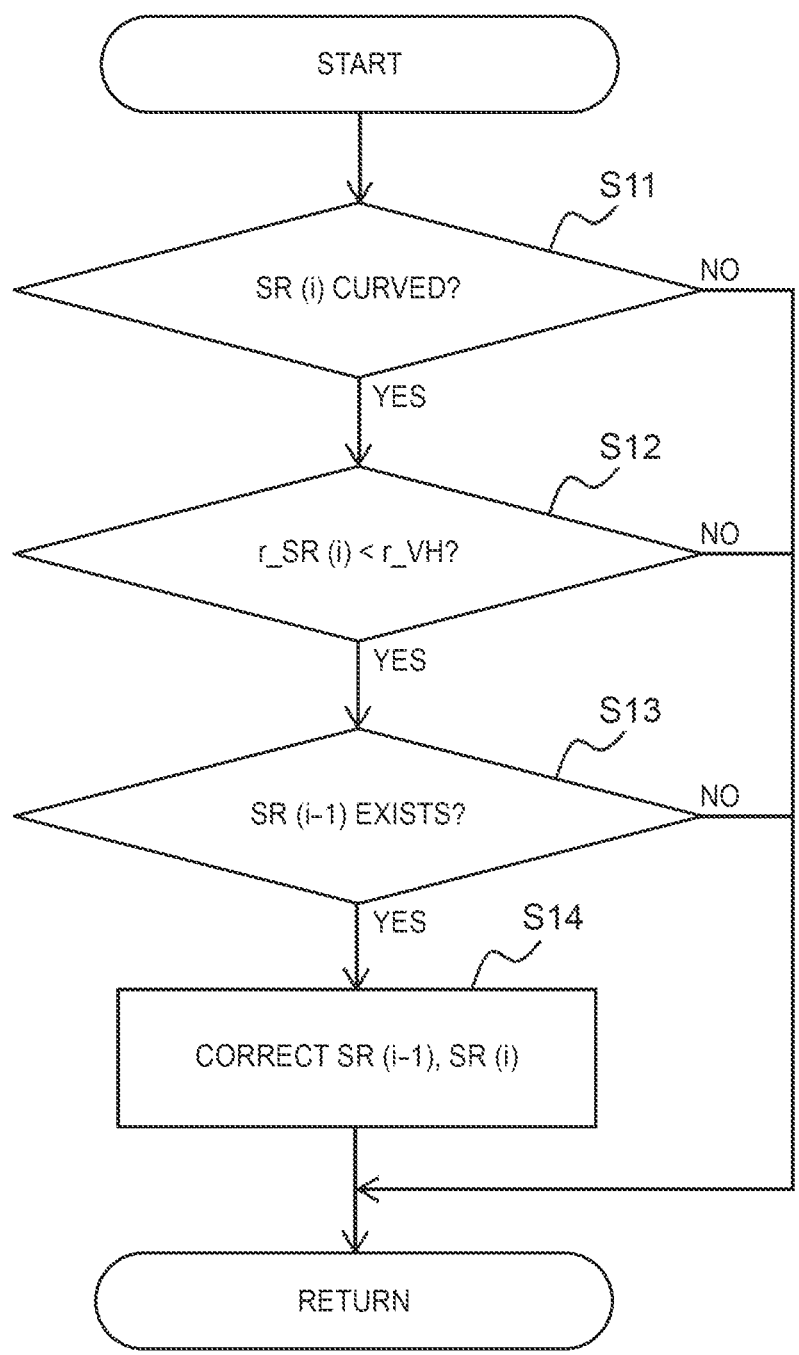
FIG. 11 is a flowchart illustrating a flow of the traveling route correction processing.

FIG. 11 is a flowchart illustrating a flow of processing of correcting the traveling route TR. The routine shown in FIG. 11 is repeatedly executed at a predetermined control cycle while the autonomous driving control is being executed by the processor 12. The routine shown in FIG. 11 may be executed every time the processor 12 generates a segmented route SR(i) as a "target route".

When the routine shown in FIG. 11 is executed, the processor 12 first determines whether the segmented route SR(i) is curved (step S11). The determination in step S11 is performed based on the information NOD used in the generation processing of the segmented route SR(i). As described above, the information NOD includes the position information (X, Y) and the angle information DEG. For example, the processor 12 determines that the segmented route SR(i) is curved when conditions C1 and C2 below are satisfied.

C1: The numerical values of the position information (X, Y) at a starting end of the segmented route SR(i) are different from the numerical values at a terminating end of the segmented route SR(i).

C2: The angle information DEG at the starting end or at the terminating end of the segmented route SR(i) is not 0.

When the condition C1 or C2 is not satisfied, the processor 12 determines that the segmented route SR(i) is not curved.

As another example of the processing in step S11, a case where the information NOD includes information on the types of curves and straight lines, instead of the angle information DEG is considered. In this case, the processor 12 executes the processing in step S11 based on the information on the types.

When the determination result in step S11 is affirmative, the processor 12 determines whether a radius of curvature r_SR(i) is less than the minimum turning radius r_VH (step S12). The radius of curvature r_SR(i) is the radius of curvature r_SR of the segmented route SR(i). For example, the processor 12 calculates the radius of curvature r_SR(i) based on the position information (X, Y) of the starting end of the segmented route SR(i), the position information (X, Y) of the terminating end of the segmented route SR(i), and the angle information DEG.

As another example of the processing in step S12, a case where the information NOD includes information the radius of curvature r_SR(i), instead of the angle information DEG is considered. In this case, the processor 12 executes the processing in step S12 based on the information on the radius of curvature.

When the determination result of step S12 is affirmative, the processor 12 determines whether the segmented route SR(i−1) exists (step S13). The segmented route SR(i−1) is a segmented route SR connected to the starting end of the segmented route SR(i) before the starting end. That is, the segmented route SR(i−1) corresponds to "preceding segmented route" of the segmented route SR(i). For example, the processor 12 executes the processing in step S13 based on whether the information NOD includes the information relating to the segmented route SR(i−1).

As another example of the processing in step S13, the processor 12 determines whether the segmented route SR(i−1) and the segmented route SR(i+1) exist. The segmented route SR(i+1) is another segmented route SR connected to the terminating end of the segmented route SR(i) behind the terminating end. That is, the segmented route SR(i+1) corresponds to "subsequent segmented route" of the segmented route SR(i). For example, the processor 12 executes the processing in step S13 based on whether the information NOD includes the information relating to the segmented route SR(i−1) and the segmented route SR(i+1).

When the determination result of step S13 is affirmative, the processor 12 corrects the segmented route SR(i−1) and the segmented route SR(i) (step S14). The correction method is as described in FIGS. 6 to 10. The order of correction starts with the segmented route SR(i), followed by and the segmented route SR(i−1). The corrected segmented route SR(i) is connected to the corrected segmented route SR(i−1).

As another example of the processing in step S14, a case where the processor 12 determines that the segmented route SR(i−1) and the segmented route SR(i+1) exist is considered. In this case, the processor 12 corrects the segmented route SR(i−1), the segmented route SR(i), and the segmented route SR(i+1). The corrected segmented route SR(i) is connected to the corrected segmented route SR(i−1) and the corrected segmented route SR(i+1).

1-3. Effect

According to the first embodiment, when a segmented route SR having the curvature radius r_SR that is less than the minimum turning radius r_VH exists, the processor 12 determines whether the preceding segmented route of the segmented route SR exists. When the processor 12 determines that the preceding segmented route exists, the segmented route SR and the preceding segmented route are corrected using the arc AR*. Performing the correction above makes it possible to avoid that the traveling route TR including the segmented route SR having a radius that is less than the minimum turning radius r_VH is set. That is, it is possible to set an appropriate traveling route TR. Accordingly, manageability of the entry and the exit of the vehicle VH can be improved.

2. Second Embodiment

Hereinafter, a second embodiment of the disclosure will be described with reference to FIGS. 12 and 13. Descriptions that are the same as those in the first embodiment will be appropriately omitted.

2-1. Traveling Route Correction Processing

In the processing of correcting the traveling route TR of the first embodiment, the arc AR* is set and the segmented route SR is corrected when a certain condition for the segmented route SR is satisfied. In the processing of correcting the traveling route TR of the second embodiment, when a certain condition for the arc AR* is satisfied, the position of the arc AR* is adjusted before the segmented route SR is corrected. Hereinafter, for convenience of description, the correction processing in the first embodiment will be referred to as "first correction processing", and the correction processing in the second embodiment will be referred to as "second correction processing".

Figure 12:
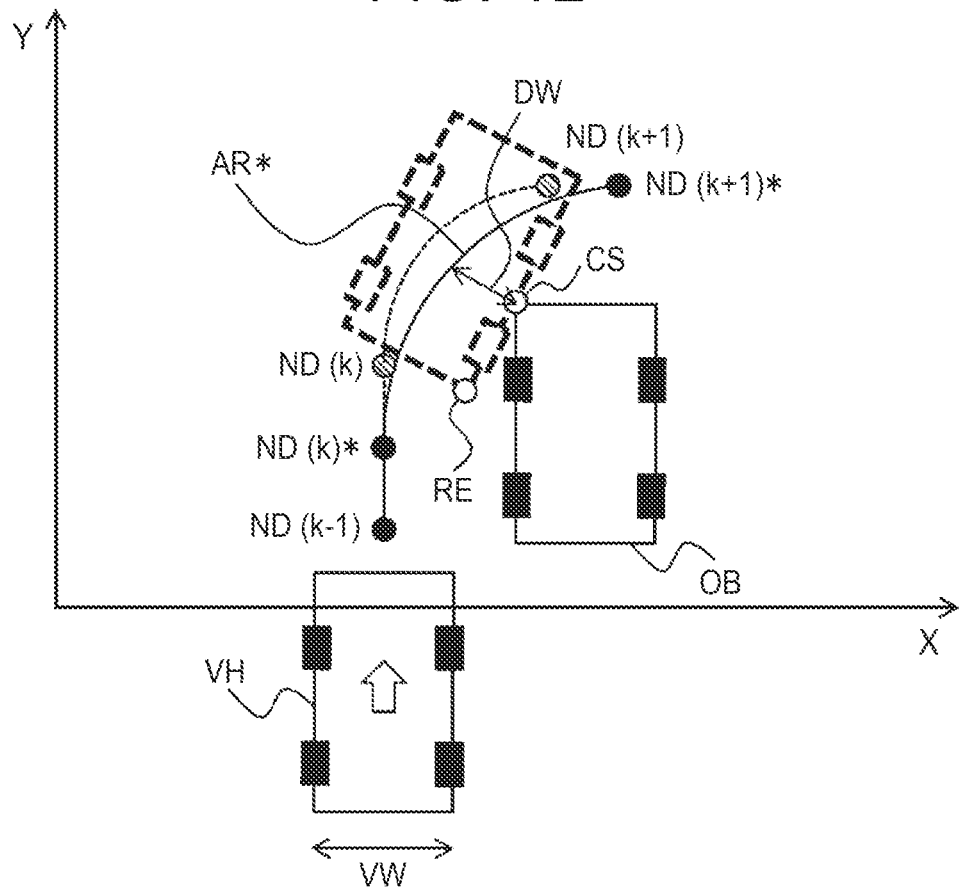
FIG. 12 is a diagram illustrating an example of the traveling route correction processing according to a second embodiment.

FIG. 12 is a diagram for explaining conditions under which the position of the arc AR* is adjusted. In the example shown in FIG. 12, the vehicle VH shown before the coordinates of the node ND(k−1) is scheduled to pass through the node ND(k−1), the node ND(k)*, and the node ND(k+1)* in this order. However, in this example, the obstacle OB (for example, another vehicle) exists near the arc AR*. Therefore, when the vehicle VH makes a turn along the segmented route SR(k+1) (that is, SR(k+1)*) replaced using the arc AR*, it is highly likely that the vehicle VH comes into contact with a front end portion of the obstacle OB between the nodes ND(k)* and ND(k+1)*.

In the second correction processing, when condition C3 below is satisfied, the processor 12 determines that the vehicle VH is highly likely to come into contact with the obstacle OB.

C3: The coordinates indicating (X, Y) of the obstacle OB include the coordinates at which a distance DW from the coordinates indicating the position information (X, Y) of the arc AR* reaches or falls below a predetermined value TH. The predetermined value TH is set using, for example, a vehicle width VW of the vehicle VH and a safety margin α (TH=0.5 VW+α).

In the second correction processing, when the processor 12 determines that the vehicle VH is highly likely to come into contact with the obstacle OB, an involvement distance ID is calculated. The involvement distance ID is a distance from the coordinates of a contact point CS of the vehicle VH during virtual traveling along the arc AR* to coordinates of a rear end portion RE of the vehicle VH on the contact point CS side (that is, the right rear end). The coordinates of the contact point CS are specified based on, for example, the position information (X, Y) of the obstacle OB when the distance DW shows the minimum value. The coordinates of the rear end portion RE are specified by aligning the Y coordinate of the reference position of the vehicle VH with the Y coordinate of the obstacle OB when the distance DW shows the minimum value.

In the second correction processing, after the involvement distance ID is calculated, the entire arc AR* is caused to slide in the direction from the starting end to the terminating end of the segmented route SR(k). However, the entire arc AR* is caused to slide such that the node ND(k)* moves on the segmented route SR(k). The movement amount is set to the involvement distance ID.

Figure 13:
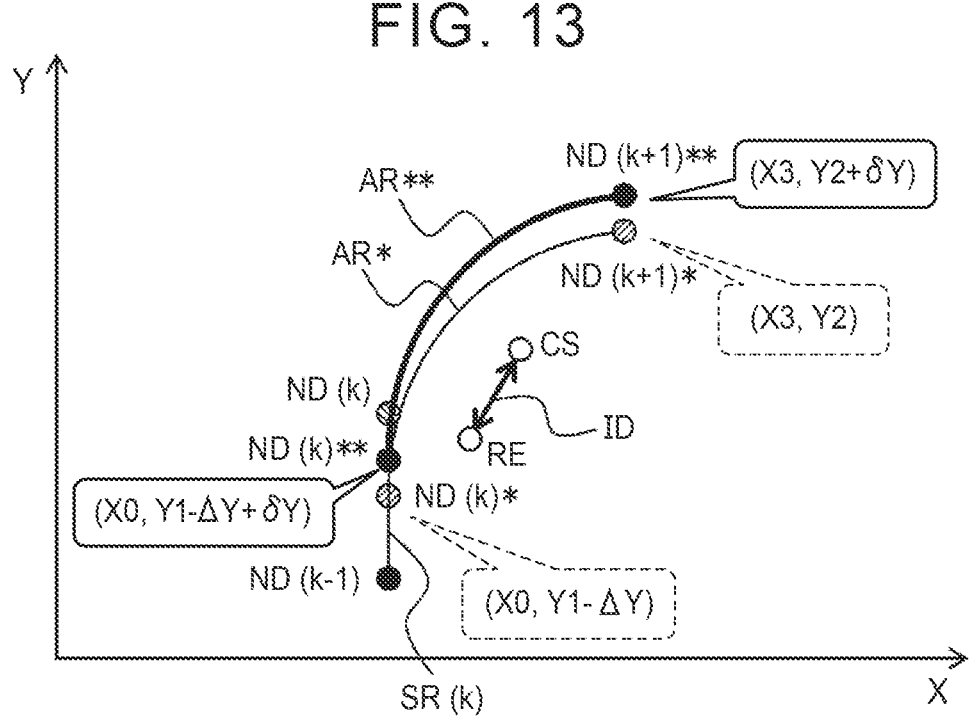
FIG. 13 is a diagram illustrating the example of the traveling route correction processing according to the second embodiment.

FIG. 13 shows the arc AR* before sliding and an arc AR** after re-sliding in the second correction processing. When the entire arc AR* is caused to slide, the coordinates of the starting end of the arc AR* (that is, the coordinates of the node ND(k)*) move from the coordinates (X0, Y1−ΔY) to the coordinates (X0, Y1−ΔY+BY). Further, the coordinates of the terminating end of the arc AR* (that is, the coordinates of the node ND(k+1)*) move from the coordinates (X3, Y2) to the coordinates (X3, Y2+BY). The movement amount δY matches the involvement distance ID.

The contents of the processing after the segmented route SR(k+1) is replaced using the arc AR** are basically the same as those in the first correction processing described in FIGS. 6 to 8. Therefore, also in the example shown in FIG. 13, a part or entire traveling route TR is corrected. In the second correction processing, the coordinates of the terminating end of the segmented route SR(k) are replaced using the coordinates of the starting end of the segmented route SR(k+1)*. That is, the coordinates of the terminating end of the segmented route SR(k) are replaced with the coordinates (X0, Y1−ΔY+δY) of the replaced node ND(k)**.

In another example of the second correction processing, a case where the segmented route SR(k) is curved to the right, similar to the example shown in FIG. 9 is considered. In this case, the entire arc AR* is caused to slide in the direction from the starting end to the terminating end of the segmented route SR(k). Also in this case, the entire arc AR* is caused to slide such that the node ND(k)* moves on the segmented route SR(k).

2-2. Effect

According to the second embodiment, the position of the arc AR* is adjusted when a certain condition for the arc AR* is satisfied. Therefore, this makes it possible to avoid that the segmented route SR that comes into contact with the obstacle OB by executing the first correction processing is set. Therefore, it is possible to set an appropriate traveling route TR including an appropriate segmented route SR. Accordingly, manageability of the entry and the exit of the vehicle VH can be improved.

What is claimed is:

1. A setting device of a traveling route, the setting device configured to set the traveling route of a vehicle along a node between a departure point and a destination point, the setting device comprising:
    a memory that stores map information having position information of the node in a two-dimensional coordinate system; and
    a processor configured to execute processing of calculating a segmented route between a plurality of the nodes that are adjacent to each other based on the map information, wherein
    in the processing of calculating the segmented route, the processor is configured to
    determine whether a target route indicating the segmented route that is a target of the processing of calculating the segmented route is curved based on the map information,
    determine whether a radius of curvature of the target route is less than a minimum turning radius of the vehicle when the target route is determined to be curved,
    determine whether a preceding segmented route that is connected to a starting end of the target route exists before the starting end when the radius of curvature is determined to be less than the minimum turning radius,
    set an arc having a sector shape, including coordinates of the starting end of the target route as a starting end of the arc and being curved in the same direction as a curved direction of the target route when the preceding segmented route is determined to exist,
    calculate an end-to-end distance from coordinates of a terminating end of the target route to coordinates of the terminating end of the arc in a direction of a coordinate axis in which the preceding segmented route extends,
    cause the entire arc to slide by an amount corresponding to the end-to-end distance in a direction parallel to the coordinate axis and in a direction from a terminating end of the preceding segmented route toward a starting end of the preceding segmented route,
    set the entire slid arc as a new segmented route in place of the target route, and
    change the coordinates of the terminating end of the preceding segmented route to the coordinates of the starting end of the slid arc, and wherein
    a radius of the sector shape is equal to the minimum turning radius,
    a center of the sector shape is positioned on a reference line that passes through the coordinates of the starting end of the target route and central coordinates of a circle having the radius of curvature as a radius, and
    a central angle of the sector shape is equal to an angle between the reference line and a straight line that passes through the coordinates of the terminating end of the target route and the central coordinates.

2. The setting device of the traveling route according to claim 1, wherein
    in the processing of calculating the segmented route, the processor is configured to:
    determine whether a subsequent segmented route that is connected to the terminating end of the target route exists ahead of the terminating end when the radius of curvature is determined to be less than the minimum turning radius; and
    change coordinates of a starting end of the subsequent segmented route to the coordinates of the terminating end of the slid arc when the subsequent segmented route is determined to exist.

3. The setting device of the traveling route according to claim 1, wherein:
    the map information has obstacle information about an obstacle around the node; and
    in the processing of calculating the segmented route, the processor is configured to
    determine whether an obstacle positioned at coordinates at which a distance from the slid arc is equal to or less than a predetermined value exists based on the obstacle information,
    calculate an involvement distance during a virtual traveling of the vehicle along the slid arc when the obstacle is determined to exist, and
    after causing the entire arc to slide by the amount corresponding to the end-to-end distance and before setting the new segmented route, cause the entire arc to slide by an amount corresponding to the involvement distance in the direction from the starting end of the preceding segmented route toward the terminating end of the preceding segmented route.

4. A setting method of a traveling route to set the traveling route of a vehicle along a node between a departure point and a destination point, the method comprising a step of calculating a segmented route between a plurality of the nodes adjacent to each other based on map information having position information of the node in a two-dimensional coordinate system, wherein
    the step of calculating the segmented route has:
    a step of determining whether a target route indicating the segmented route that is a target of the step of calculating the segmented route is curved based on the map information;
    a step of determining whether a radius of curvature of the target route is less than a minimum turning radius of the vehicle when the segmented route is determined to be curved;
    a step of determining whether a preceding segmented route that is connected to a starting end of the target route exists before the starting end when the radius of curvature is determined to be less than the minimum turning radius;
    a step of setting an arc having a sector shape, including coordinates of the starting end of the target route as a starting end of the arc and being curved in the same direction as a curved direction of the target route when the preceding segmented route is determined to exist;

a step of calculating an end-to-end distance from coordinates of a terminating end of the target route to coordinates of the terminating end of the arc in a direction of a coordinate axis in which the preceding segmented route extends;

a step of causing the entire arc to slide by an amount corresponding to the end-to-end distance in a direction parallel to the coordinate axis and in a direction from a terminating end of the preceding segmented route toward the starting end of the preceding segmented route;

a step of setting the entire slid arc as a new segmented route in place of the target route; and a step of changing the coordinates of the terminating end of the preceding segmented route to the coordinates of the starting end of the slid arc, and wherein a radius of the sector shape is equal to the minimum turning radius, a center of the sector shape is positioned on a reference line that passes through the coordinates of the starting end of the target route and central coordinates of a circle having the radius of curvature as a radius, and a central angle of the sector shape is equal to an angle between the reference line and a straight line that passes through the coordinates of the terminating end of the target route and the central coordinates.

5. The setting method of the traveling route according to claim 4, wherein the step of calculating the segmented route has:

a step of determining whether a subsequent segmented route that is connected to the terminating end of the target route ahead of the terminating end exists when the radius of curvature is determined to be less than the minimum turning radius; and a step of changing coordinates of a starting end of the subsequent segmented route to the coordinates of the terminating end of the slid arc when the subsequent segmented route is determined to exist.

6. The setting method of the traveling route according to claim 4, wherein:

the map information further has obstacle information about an obstacle around the node; and the step of calculating the segmented route has a step of determining whether an obstacle positioned at coordinates at which a distance from the slid arc is equal to or less than a predetermined value exists based on the obstacle information, a step of calculating an involvement distance during a virtual traveling of the vehicle along the slid arc when the obstacle is determined to exist, and after causing the entire arc to slide by the amount corresponding to the end-to-end distance and before setting the new segmented route, a step of causing the entire arc to slide by an amount corresponding to the involvement distance in the direction from the starting end of the preceding segmented route toward the terminating end of the preceding segmented route.

* * * * *